United States Patent [19]
Morgan et al.

[11] Patent Number: 5,305,440

[45] Date of Patent: Apr. 19, 1994

[54] FILE EXTENSION BY CLIENTS IN A DISTRIBUTED DATA PROCESSING SYSTEM

[75] Inventors: Stephen P. Morgan, Mahopac, N.Y.; Todd A. Smith, Austin, Tex.

[73] Assignee: International Business Machines Corporation, Armonk, N.Y.

[21] Appl. No.: 898,234

[22] Filed: Jun. 12, 1992

Related U.S. Application Data

[63] Continuation of Ser. No. 739,799, Aug. 1, 1991, abandoned, which is a continuation of Ser. No. 352,220, May 15, 1989, abandoned.

[51] Int. Cl.5 ............................................. G06F 13/14
[52] U.S. Cl. ............................. 395/200; 364/242.94; 364/230.4; 364/230; 364/254
[58] Field of Search ............... 395/200, 425, 800, 500, 395/725

[56] References Cited

U.S. PATENT DOCUMENTS

| | | | |
|---|---|---|---|
| 4,325,120 | 4/1982 | Colley et al. | 364/200 |
| 4,811,216 | 3/1989 | Bishop et al. | 364/200 |
| 4,849,878 | 7/1989 | Roy | 364/200 |
| 4,881,164 | 11/1989 | Hailpern et al. | 364/200 |
| 4,887,204 | 12/1989 | Johnson et al. | 364/200 |

OTHER PUBLICATIONS

D. Baum et al, "On Prefetching Strategies for Satellite Communication", 7th International Conference on Distributed Computing Systems, Sep. 1987, Berlin, West Germany, pp. 258-263.
A. B. Sheltzer et al, "Internet Locus: Extending Transparency to an Internet Environment", IEEE Transaction on Software Engineering, vol. SE-12, No. 11, Nov. 1986, pp. 1067-1075.
R. W. Dey et al, "Anticipation of Data Set Expansion", IBM Technical Disclosure Bulletin, vol. 25, No. 7A, Dec. 1982, pp. 3280-3281.
Kleiman, S,. R., "Vnodes: An Architecture for Multiple File System Types in Sun UNIX", pp. 238-247.
Sandberg, R. et al, "Design and Implementation of the Sun Network File System", pp. 119-130.
Walsh, Dan et al, "Overview of the Sun Network File System", pp. 117-124.
Chang, JoMei, "Status Monitor Network Locking Service for NFS", pp. 1-3.
Chang, JoMei, "SunNet", pp. 71-75.
Taylor, Bradley, "Secure Networking in the Sun Environment", pp. 28-36.
Rifkin et al. "RFS Architectural Overview", pp. 1-12.
Hamilton, Richard et al, "An Administrator's View of Remote File Sharing", pp. 1-9.
Houghton, Tom et al, "File System Switch", pp. 1-2.
Olander, David J. et al, "A Framework for Networking in System V", pp. 1-8.

*Primary Examiner*—Kevin A. Kriess
*Attorney, Agent, or Firm*—Wayne P. Bailey; Marilyn D. Smith

[57] ABSTRACT

The system and method of this invention controls how client data processing systems in a distributed networking environment can efficiently extend files and write into regions of the files previously unoccupied by data. The server data processing system manages the distributed allocation of new file blocks by sending nascent zeros in addition to real bytes that have been requested by the client data processing system. Nascent zeros are logically zero bytes that have never been stored to or written to, and may be outside the current extent of the file. The server determines whether or not this additional range of nascent zeros will be sent to a client depending upon the amount of physical storage available at the server, and whether or not other client data processing systems require access to this range of blocks. Likewise, the client data processing system has the option of writing to this additional range of nascent zeros. By writing to the additional range of nascent zeros, a client data processing system can minimize the network traffic overhead used in sending messages to the server data processing system requesting a range of bytes.

12 Claims, 9 Drawing Sheets

PUT BYTES ⎯⎯ 460

REVOKE_BYTES ⎯⎯ 470 ature for Multiple File System Types in Sun UNIX",
FILE EXTENSION BY CLIENTS IN A DISTRIBUTED DATA PROCESSING SYSTEM This is a continuation of application Ser. No. 07/739,799, filed Aug. 1, 1991, now abandoned which is a continuation of application Ser. No. 07/352,220, filed May 15, 1989, now abandoned.

CROSS-REFERENCES TO RELATED APPLICATIONS:

Application Ser. No. 07/014,897 filed Feb. 13, 1987, in the name of Johnson et al for "A System And Method for Accessing Remote Files In A Distributed Networking Environment", herein incorporated by reference.

Application Ser. No. 07/362,090, now U.S. Pat. No. 5,113,519 filed May 15, 1989, in the name of Johnson et al for "Maintenance of File Attributes In A Distributed Data Processing System", herein incorporated by reference.

Application Ser. No. 07/352,075 filed May 15, 1989, in the name of Johnson et al for "Remote Authentication And Authorization In A Distributed Data Processing System", herein incorporated by reference.

Application Ser. No. 07/751,603 filed May 15, 1989, in the name of Loucks et al for "A Flexible Interface To Authentication Services In A Distributed Data Processing System", herein incorporated by reference.

Application Ser. No. 07/893,959, now U.S. Pat. No. 5,226,159 filed May 15, 1989, in the name of D. W. Johnson et al for "File Lock Management In A distributed Data Processing System", herein incorporated by reference.

Application Ser. No. 07/352,084, now U.S. Pat. No. 5,175,851 filed May 15, 1989, in the name of D. W. Johnson et al for "System And Method For Efficient Control Of Cached Data In A Distributed Data Processing System", herein incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to processing systems connected through a network, and more particularly to the modification of files between local and remote processing systems within the network.

2. Background Art

As shown in FIG. 1, a distributed networking environment 1 consists of two or more nodes A, B, C, connected through a communication link or a network 3. The network 3 can be either a local area network (LAN), or a wide area network (WAN).

At any of the nodes A, B, C, there may be a processing system 10A, 10B, 10C, such as a workstation. Each of these processing systems 10A, 10B, 10C, may be a single user system or a multi-user system with the ability to use the network 3 to access files located at a remote node. For example, the processing system 10A at local node A, is able to access the files 5B, 5C at the remote nodes B, C, respectively.

Within this document, the term "server" will be used to indicate the processing system where the file is permanently stored, and the term "client" will be used to mean any other processing system having processes accessing the file. It is to be understood, however, that the term "server" does not mean a dedicated server as that term is used in some local area network systems The distributed services system in which the invention is implemented is truly a distributed system supporting a wide variety of applications running at different nodes in the system which may access files located anywhere in the system.

As mentioned, the invention to be described hereinafter is directed to a distributed data processing system in a communication network. In this environment, each processor at a node in the network potentially may access all the files in the network no matter at which nodes the files may reside.

Other approaches to supporting a distributed data processing system are known. For example, IBM's Distributed Services for the AIX operating system is disclosed in Ser. No. 014,897 "A System and Method for Accessing Remote Files in a Distributed Networking Environment ", filed Feb. 13, 1987 in the name of Johnson et al. In addition, Sun Microsystems has released a Network File System (NFS) and Bell Laboratories has developed a Remote File System (RFS). The Sun Microsystems NFS has been described in a series of publications including S. R. Kleiman, "Vnodes: An Architecture for Multiple File System Types in Sun UNIX", *Conference Proceedings, USENIX* 1986 *Summer Technical Conference and Exhibition,* pp. 238 to 247; Russel Sandberg et al., "Design and Implementation of the Sun Network Filesystem", *Conference Proceedings, Usenix* 1985, pp. 119 to 130; Dan Walsh et al., "Overview of the Sun Network File System", pp. 117 to 124; JoMei Chang, "Status Monitor Provides Network Locking Service for NFS", JoMei Chang, "SunNet", pp. 71 to 75; and Bradley Taylor, "Secure Networking in the Sun Environment", pp. 28 to 36. The AT&T RFS has also been described in a series of publications including Andrew P. Rifkin et al., "RFS Architectural Overview", *USENIX Conference Proceedings,* Atlanta, Ga. (June 1986), pp. 1 to 12; Richard Hamilton et al., "An Administrator's View of Remote File Sharing", pp. 1 to 9; Tom Houghton et al., "File Systems Switch", pp. 1 to 2; and David J. Olander et al., "A Framework for Networking in System V", pp. 1 to 8.

One feature of the distributed services system in which the subject invention is implemented which distinguishes it from the Sun Microsystems NFS, for example, is that Sun's approach was to design what is essentially a stateless server. This means that the server does not store any information about client nodes, including such information as which client nodes have a server file open or whether client processes have a file open in read_only or read_write modes. Such an implementation simplifies the design of the server because the server does not have to deal with error recovery situations which may arise when a client fails or goes off-line without properly informing the server that it is releasing its claim on server resources.

An entirely different approach was taken in the design of the distributed services system in which the present invention is implemented. More specifically, the distributed services system may be characterized as a "stateful implementation". A "stateful" server, such as that described here, does keep information about who is using its files and how the files are being used. This requires that the server have some way to detect the loss of contact with a client so that accumulated state information about that client can be discarded. The cache management strategies described here cannot be implemented unless the server keeps such state information.

The problems encountered in accessing remote nodes can be better understood by first examining how a stand-alone system accesses files. In a stand alone system, such as 10 as shown in FIG. 2, a local buffer 12 in the operating system 11 is used to buffer the data transferred between the permanent storage 2, such as a hard file or a disk in a workstation, and the user address space 14. The local buffer 12 in the operating system 11 is also referred to as a local cache or kernel buffer.

In the stand-alone system, the kernel buffer 12 is divided into blocks 15 which are identified by device number, and logical block number within the device. When a read system call 16 is issued, it is issued with a file descriptor of the file 5 for a byte range within the file 5, as shown in step 101, FIG. 3. The operating system 11 takes this information and converts it to device number, and logical block numbers in the device, step 102, FIG. 3. If the block is in the cache, step 103, the data is obtained directly from the cache, step 105. In the case where the cache doesn't hold the sought for block at step 103, the data is read into the cache in step 104 before proceeding with step 105 where the data is obtained from the cache.

Any data read from the disk 2 is kept in the cache block 15 until the cache block 15 is needed for some other purpose. Consequently, any successive read requests from an application 4 that is running on the processing system 10 for the same data previously read is accessed from the cache 12 and not the disk 2. Reading from the cache is far less time consuming than reading from the disk.

Similarly, data written from the application 4 is not saved immediately on the disk 2, but is written to the cache 12. This saves disk accesses if another write operation is issued to the same block. Modified data blocks in the cache 12 are saved on the disk 2 periodically.

Use of a cache in a stand-alone system that utilizes an AIX operating system improves the overall performance of the system since disk accessing is eliminated for successive reads and writes. Overall performance is enhanced because accessing permanent storage is slower and more expensive than accessing a cache.

In a distributed environment, as shown in FIG. 1, there are two ways the processing system 10C in local node C could read the file 5A from node A. In one way, the processing system 10C could copy the whole file 5A, and then read it as if it were a local file 5C residing at node C. Reading a file in this way creates a problem if another processing system 10A at another node A modifies the file 5A after the file 5A has been copied at node C as file 5C. The processing system 10C would not have access to these latest modifications to the file 5A.

Another way for processing system 10C to access a file 5A at node A is to read one block, e.g. N1, at a time as the processing system at node C requires it. A problem with this method is that every read has to go across the network communication link 3 to the node A where the file resides. Sending the data for every successive read is time consuming.

Accessing files across a network presents two competing problems as illustrated above. One problem involves the time required to transmit data across the network for successive reads and writes. On the other hand, if the file data is stored in the node to reduce network traffic, the file integrity may be lost. For example, if one of the several nodes is also writing to the file, the other nodes accessing the file may not be accessing the latest updated data that has just been written. As such, the file integrity is lost since a node may be accessing incorrect and outdated files.

In operating systems based upon the UNIX operating system, it is not necessary to write to every byte within a file. For example, if a file is 10,000 bytes, a process may write to the first byte of a file, and the 10,000th byte of the file, and not to any other of the bytes. If there is an attempt to read byte number 10,001, this is beyond the end of the file, and it cannot be read. However, if bytes 2–9,999 are attempted to be read, they are not beyond the end of the file. These bytes in the middle have never been written to, and no disk block has ever been allocated to them. This is an advantage of file systems that are based on the UNIX operating system. These file systems do not allocate blocks for bytes that have not been written to. However, if a process attempts to read from these bytes, since they are not past the end of the file, the process gets back logically zero bytes.

Therefore, in the preferred embodiment of this invention, before a process can write bytes, a process has to request those bytes in a get_bytes request. Once these bytes are received, the process can overwrite these bytes. For example, suppose a process wants to write to one byte. The process may request a 4K range of bytes, although it could request just the one byte or a different range of bytes. Once the process receives this range of bytes, the process may write to just one of those bytes in the range of bytes received. A 4k range of bytes was used in this example because a client data processing system manages its data on a page level basis, which is approximately 4K bytes.

However, the most frequent case for writing is when a process writes a new file with no existing data. In this case, a process begins writing at the beginning of the new file and writes to the end of the file. Therefore, a process is constantly writing to a portion of the file that did not previously exist. In previous systems, before this writing could be done, a process running in the client processing system had to go across the network and request a whole page of bytes. Once this page of bytes had been written to, a next page of bytes could be requested. However, this results in a lot of network traffic between the client data processing system and the server data processing system just to get a block of bytes that have logical zeros.

SUMMARY OF THE INVENTION

In a distributed data processing system, data can be accessed by a plurality of nodes. In this invention, the data is controlled by one node within this data processing system known as the server. The other nodes that access this data are known as the clients. Clients gain access to the data by sending a request to the server. The server returns the data to the clients that requested access to the data. The client can then read and/or modify the requested data. When multiple clients have an interest in the data, the server node has to synchronize the access to the data to keep it consistent. The server node does this by ensuring that at any given time, each portion of the data accessible for modification at a node is not accessible for reading or modification by any other nodes while allowing portions of the data accessible only for reading to be accessible by any number of nodes.

In order to enforce this synchronization, clients that wish to write to portions of a file or to extend a file, must first request a write access to a range of bytes, which includes those bytes that are to be modified, from the server. Clients request a range of bytes through a get_bytes message to a server. The server replies to that request with the requested bytes. The clients may then modify those bytes. However, in some circumstances, it may be necessary for the server to revoke data that has been previously distributed to a client, if a conflicting request arises from a different client, in order to synchronize the accessing of the range of bytes from several clients. A server revokes a range of bytes through a revoke_bytes message from the server to the client.

Although most writing to files is done at the end where each new block is newly allocated and holds only zero bytes, in the most general case when a process writes or stores into a block of a remote file, the block must be obtained from the file's server before the write or store can be done. To mitigate the cost of the general mechanism, this invention optimizes an important special case: writing or storing into blocks not previously in the file. This reduces the cost of appending to existing files and creating new files.

If a client knows that a block in a file is a new block, one not yet in the file, it could create a block of zeros and use it without contacting the server. This would avoid the cost of a get_bytes request, but it would also create a block at a client without the allocation of a corresponding disk block at the file's server. To keep clients from overcommitting the server's resources and from interfering with each other by creating the same block in two places, servers maintain control over the allocation of new pages.

Servers manage the distributed allocation of new file blocks by sending nascent zeros in addition to real bytes to clients. When a server replies to a get_bytes request, it may optionally return an unrequested range of nascent zeros. Nascent zeros are new, logically zero bytes that are not yet contained in the file. The range of nascent zeros returned is usually larger than the range of requested bytes. The nascent zeros have never been stored or written to, and may be outside the current extent of the file. Like real bytes from the file, a range of nascent zeros is sent to a client that may write into them only if no other client has any data (real or nascent) that overlaps the range. Like real bytes, nascent zeros can be revoked by the server with a revoke_bytes message.

This invention allows that each time a process requests bytes from the server data processing system, the server not only sends back the bytes that were requested, but the server may also send back an additional range of bytes which contains data that has never been written to. This type of data will be referred to herein as nascent zeros. The server sends back this additional range of bytes if the server determines that the client may want to write to these additional bytes. The server is giving the client the permission to write into this larger range of bytes than what the client originally requested.

It is important that the server manages this additional range of bytes instead of having the client be able to just go ahead and write to a range of bytes that has been written to previously. Since the server has control over the amount of physical storage that is available, it is important that the server is the one giving the clients the permission to write to this additional range of bytes. The server has to insure that when the file is closed, and the data is returned, the server has enough space to store this additional data. Therefore, before a server gives out a range of nascent zeros to a client, the server has to make sure that the disk space has been reserved if the client decides to write to this additional range.

However, a client can decide not to write to this additional range. In this case, the server still reserves the disk space. The server determines when the client closes the file whether this additional range of bytes has been written to. If the client has not written to this additional range of nascent zeros, the server can free up this disk space. The server only holds the disk space for as long as the client has the possibility of writing to those bytes.

In conjunction with the preferred embodiment of this invention, it may be necessary for the server to revoke the nascent zero range of bytes that have been previously given to a client, since another client may request this additional range of bytes. Therefore, the server can revoke not only the range of bytes requested by a client, but also the additional range of nascent zero bytes that were given to the client by the server even though the client may not have specifically requested them.

Some advantages of the present invention are as follows. A server can return a range of nascent zeros not only from just the end of a file, but any range of bytes within a file that has not been previously written to. For example, a client may request a range of bytes within a file. If the server determines that a range of nascent zeros exists adjacent to the range in which the client is requesting, the server has the option of giving the client this additional range of nascent zeros, also.

Another advantage is illustrated in the following example. A client may request a range of bytes representing the last block of the file. The server may return not only this last block of bytes, but also any number of additional pages of nascent zeros. For illustration purposes, say the server returns four additional pages. When the client finishes writing to this last block of bytes and the additional four pages of nascent zeros, the client can go back to the server and request another block of bytes. The server can then return to the client not only the clients' next requested block of bytes, but also another additional four pages of nascent zeros. In this case, network traffic is reduced since the client only has to go back to the server for every fifth requested block of bytes instead of every block.

As a result of this invention, there is no specific protocol that is required to extend a file. The file extension is performed automatically by the server offering to clients additional ranges of nascent zeros. With every get_bytes request, the server has the options of returning additional ranges of bytes of nascent zeros.

With this aspect of the protocol, a server is not required to return nascent zeros. Therefore no additional messages were needed in designing this protocol to handle requests for nascent zeros. Therefore, servers are not required to adhere to a protocol that requires nascent zeros to be returned. Therefore, a server that was designed to return nascent zeros can still function in a distributed data processing system where other servers in the system are not designed to optionally return nascent zeros. Likewise, a client is not obligated to use the nascent zeros that are returned. A client has the option of not using this additional range of nascent zeros and going back to the server for each range of bytes as the client needs them. Therefore, a client that recognizes that nascent zeros are being returned and can write to them, can function in the same distributed data processing system where other clients do not recognize this additional range of nascent zeros. In this way high performance servers can still communicate with low function clients, and vice versa, in a distributed data processing system. This eliminates the need of negotiating between servers and clients as to which level of support will be used during the communication between the server and the client.

Instead of having the client decide as to how much the client needs to ask for and having the server respond to that request, the server is making the decision as to whether these additional range of nascent zero bytes will be handed out to clients. For example, if several clients are writing to the end of the file, the server may determine that the revoke_bytes message traffic is too high. In this case, the server can decide not to give out additional ranges of nascent zeros. In addition, the server may determine that the disk is nearing capacity. In this case, the server can determine not to give out any more nascent zero ranges in order to conserve the space on the disk. Conversely, if there is a lot of space left on the disk, the server can hand out large ranges of nascent zeros to clients without the danger that some client will not have enough disk space.

DESCRIPTION OF THE PREFERRED EMBODIMENT

In a distributed data processing system, there exists a plurality of nodes that have access to shared data. This invention governs the access to files by a plurality of nodes in this distributed data processing system. The file is physically stored at a node called the server. The server is the processing system that has the long term storage of the file. Other nodes attached to the server by means of a communications network can also have access to this file. These nodes are known as clients under these circumstances. Any node can be a server for some files, and be a client for other files. A node can act in both capacities at the same time; accessing remote files as clients while providing service to other nodes as servers.

The actions of a node as a client and the actions of the node as a server are independent from each other. Therefore, these two actions will be described separately, even though it is possible for these two actions to be happening concurrently.

With reference to FIGS. 4A–4D, the internode messages used herein are described.

Figure 1:
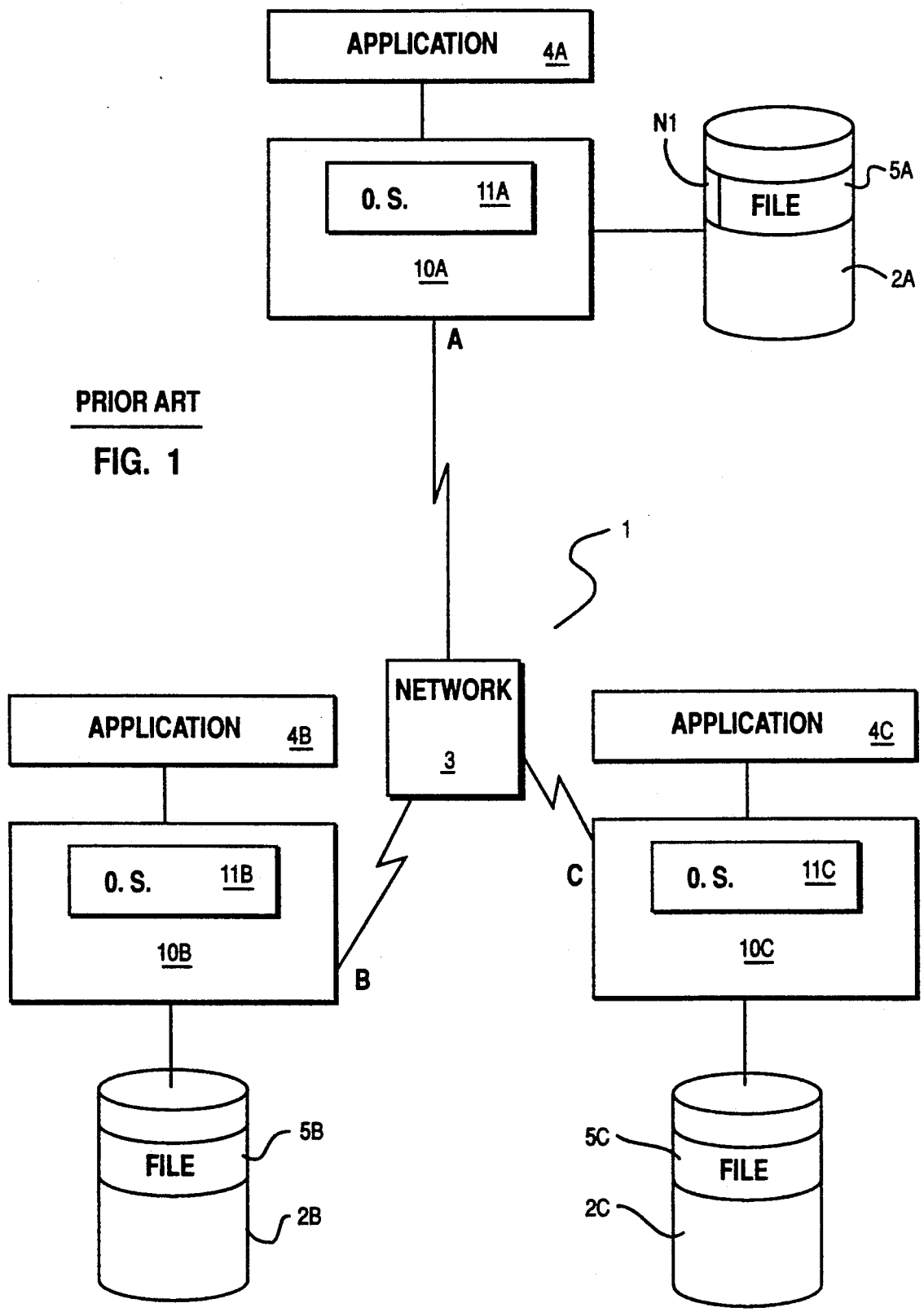
FIG. 1 is a block diagram of a distributed data processing system known in the art.
Figure 2:
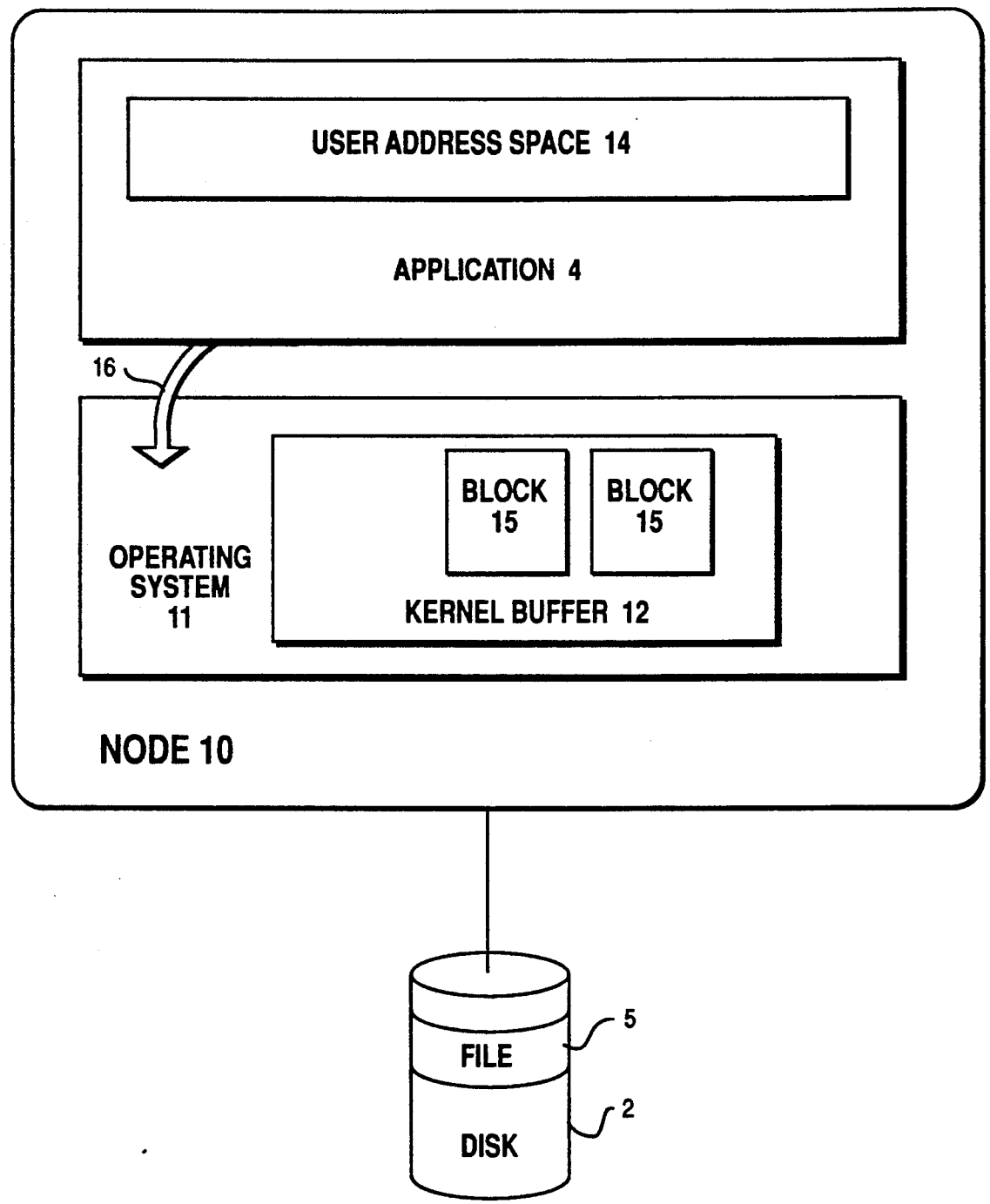
FIG. 2 is a block diagram showing a stand-alone data processing system known in the art for accessing a file through system calls.
Figure 3:
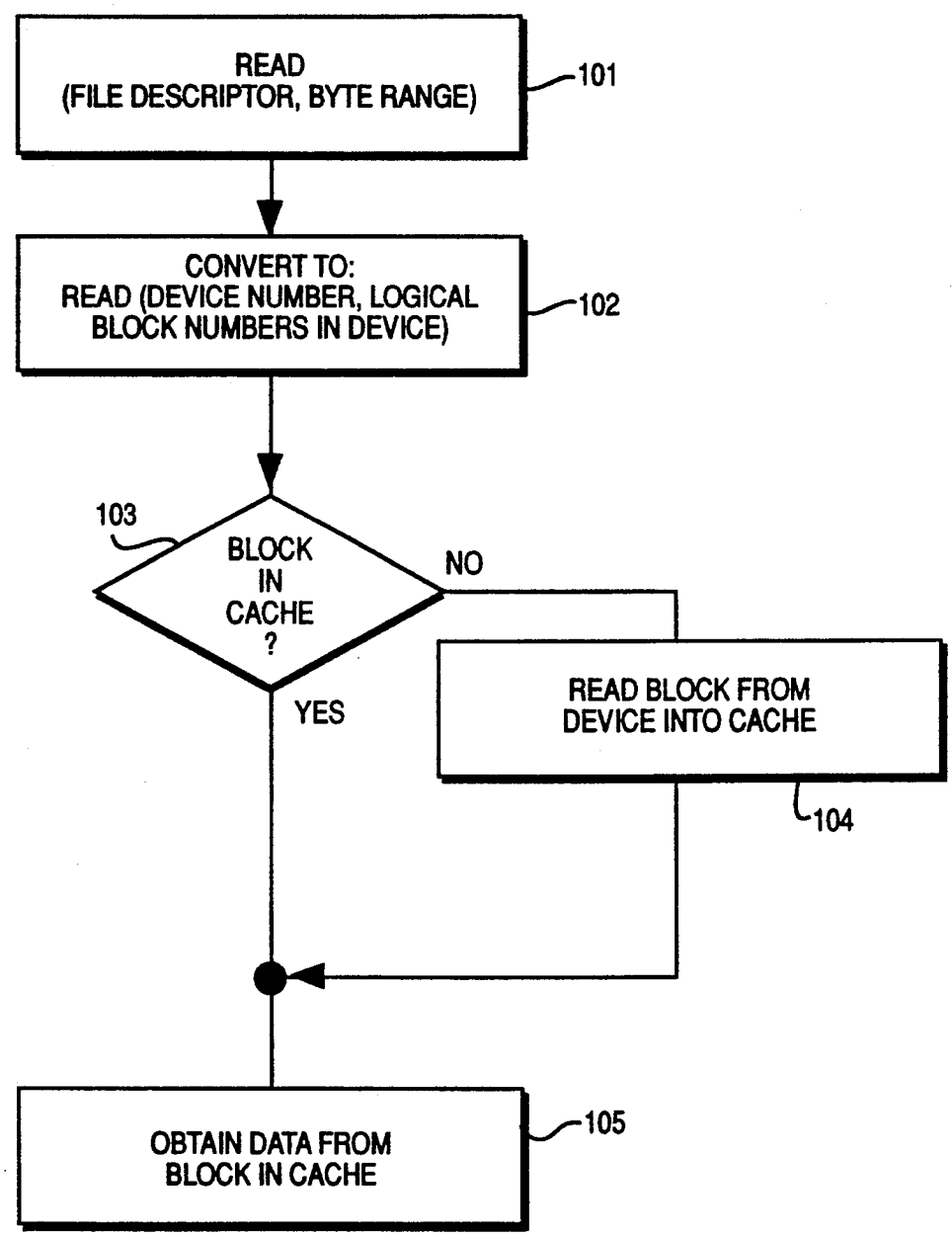
FIG. 3 is a flow diagram of the data processing system of FIG. 2 accessing a file through a system call.
Figure 4A:
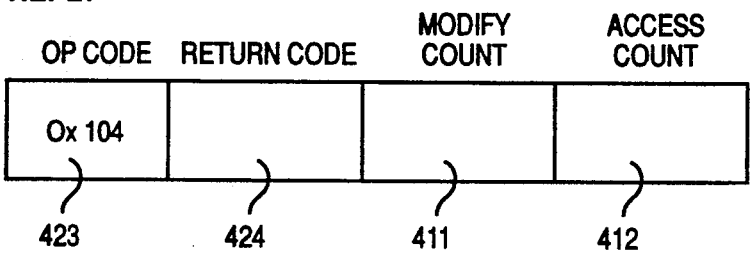
FIG. 4A is a data structure of a close message for informing the server of a close operation on the file.

FIG. 4A shows the close message 410 used by clients to inform the server of close operations. The modify count 411 is a value that reflects modifications at the client. The access count 412 is a value that reflects accesses at the client.

Figure 4B:
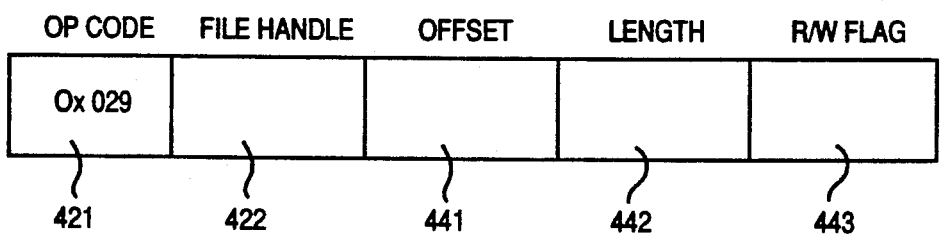
FIG. 4B is a data structure of a get_bytes message for requesting data bytes from a file.
Figure 4B:
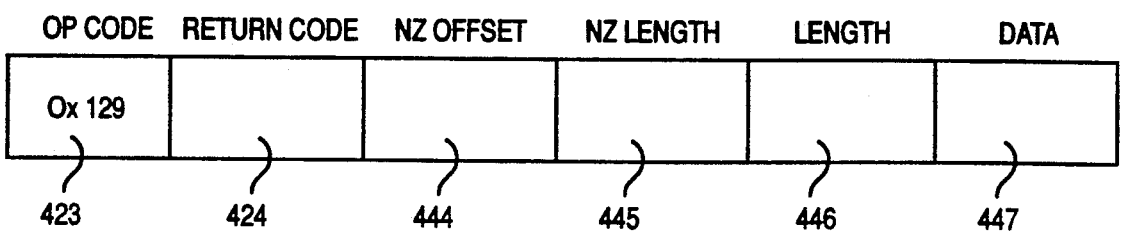

FIG. 4B shows the get_bytes message 440 which requests data bytes from a file. The offset 441 is the offset in the file that marks the beginning of the data that is requested. The length 442 is the number of requested bytes. The read/write flag 443 is used to indicated that the client is requesting a read only copy of the data or a writable copy of the data. The allowed values of rw_flag are 0x0000 if the client will only read from the byte range, and 0x0001 if the client may modify the bytes. The server will only perform the get_bytes operation if the client node has previously opened, and not yet closed the file in a compatible mode. If the rw_flag 443 is read only, then the client must have the file open. If the rw_flag 443 is read write, then the client must have the file open for writing.

In the reply of the get_bytes message 440, the nz_offset 444 is the offset within the file for which the bytes have been requested for which there are nascent zeros. This field is meaningful only when the field nz_length is greater than zero. The field nz_length 445 is the number of bytes of nascent zeros beginning at offset nz_offset 444 which the server chooses to return to the requestor. The server may always choose not to do any nascent zero processing and indicates this by returning zero in this field. Length 446 is the length of the returned data. Data 447 is the actual data bytes requested.

Figure 4C:
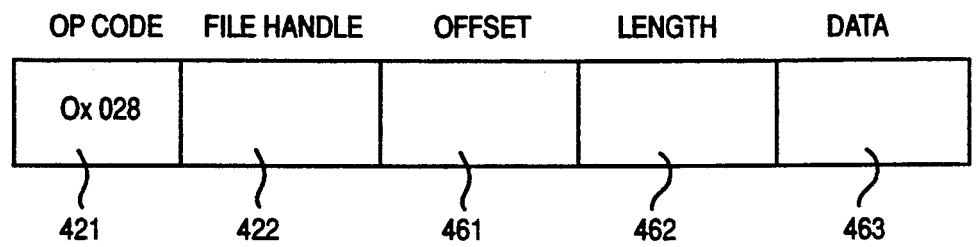
FIG. 4C is a data structure of the put_bytes message for sending modified bytes back to the server data processing system from the client data processing system.

FIG. 4C shows the put_bytes message 460. The client returns modified data to the server with the put_bytes message 460. The server will only perform the put_bytes operation if the client has previously opened, and not yet closed, the file for writing. Offset 461 is the offset within the file where the data bytes 463 of length 462 should be placed.

Figure 4D:
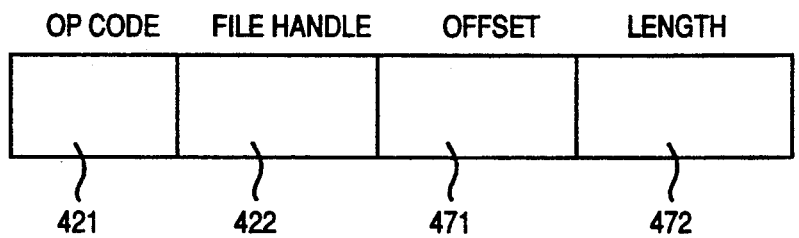
FIG. 4D is a data structure of the revoke_bytes message for revoking the bytes previously sent in the reply to a get_bytes message.
Figure 4D:
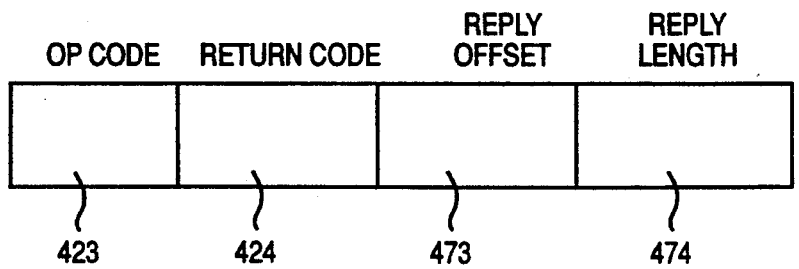

FIG. 4D shows the revoke_bytes message 470. This message is sent from a file's server to a client to revoke the bytes previously given to the client in the reply to a get_bytes message 440. The client does not send the reply until, for the byte range indicated by offset 471 and length 472, it has discarded all clean cached data and nascent zeros and has written all dirty data to the server and received replies. When the client sends the reply, it must have no cached data for the revoked byte range. This message revokes the client's right to use any previously returned nascent zeros which fall within the revoke range. Any data or nascent zeros within the revoked byte range returned by get_bytes requests which were outstanding when a revoke_bytes is processed must be discarded when they arrive. The client may chose to revoke a larger byte range than requested, or it may be able to determine that it has nothing to revoke in a larger range than the requested range. In such cases, reply_offset 473 and reply_length 474 indicate a range for which the client has no cached pages. Reply offset 473 and reply length 474 must at least include the range indicated by offset 471 and length 472.

Figure 6:
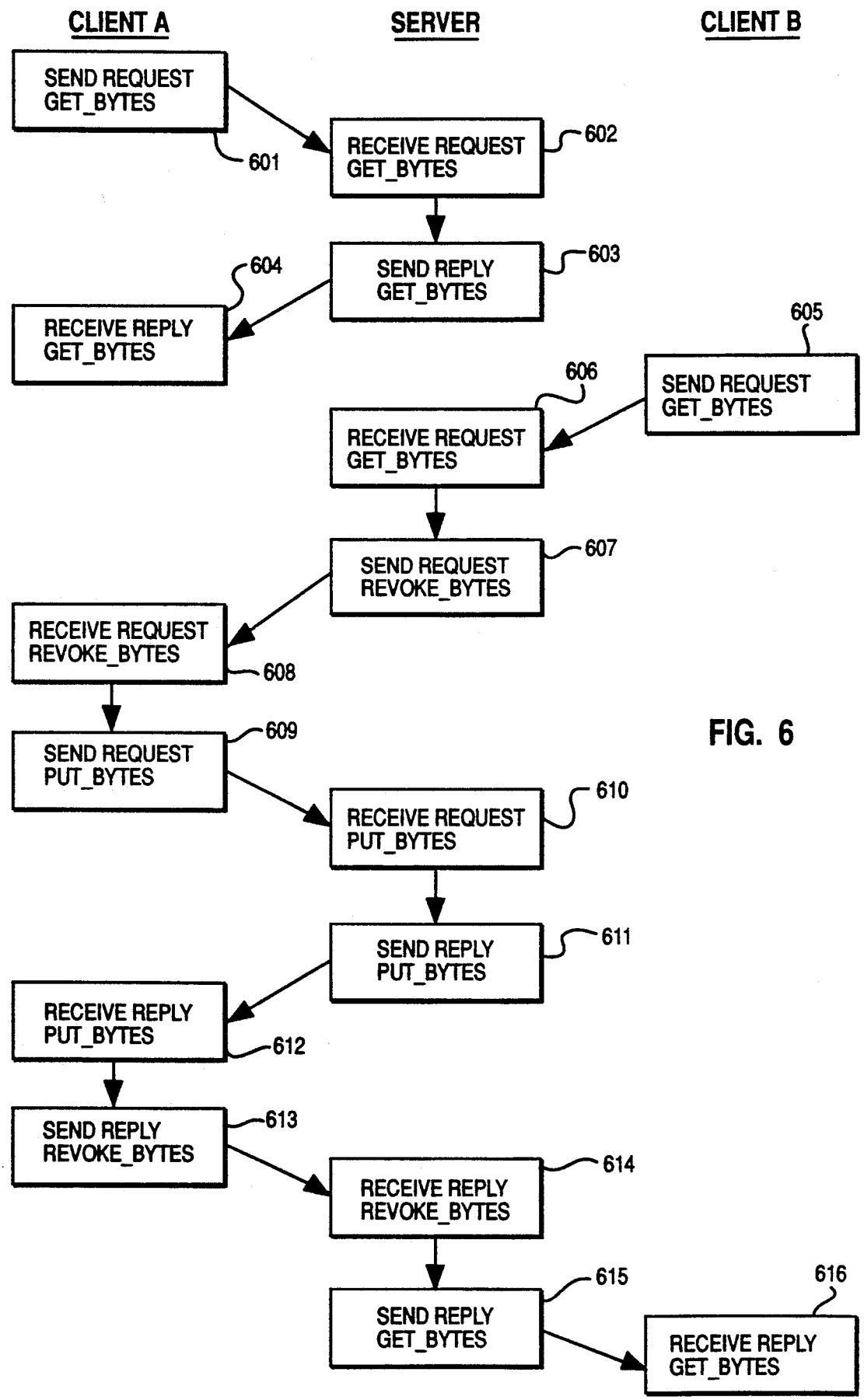
FIG. 6 is a flow diagram showing the internode message flow between two clients and a server illustrating the server's operation in response to requests from clients for access to bytes within a file via the get_bytes, revoke_bytes, and put_bytes requests.

Referring to FIG. 6 in conjunction with FIG. 4A-4D, when a client wishes to access data in a file, the client sends a request known as a get_bytes request or message to the file's server, steps 601, 602. A get_bytes request specifies, in addition to other items, the range of bytes 441, 442 (FIG. 4B) that this client is interested in having access to. The get_bytes request 440 is sent from the client to the server. The server replies, when ready, to the get_bytes request by sending back the data in that range to the requesting client, steps 603, 604. This get_bytes reply enables the clients to have access to this data.

In the cases where a get_bytes request 440 arrives, step 605, 606 at a server after other get_bytes requests which that server has satisfied previously, step 603, it may be necessary for the server to revoke bytes that have been previously sent to other clients, step 607. Bytes are revoked with a revoke_bytes message 470, FIG. 4D. Revoke_bytes messages 470 are sent from servers to client machines. Clients are obligated to respond to a revoke_bytes request by sending back any changed data in the range of bytes that is being revoked. The client is also obligated to discard any data that has not changed within that range.

Clients send modified data back to the server with the put_bytes message 460, FIG. 4C, step 609, FIG. 6. This message, like the get_bytes message and the revoke_bytes message, has a reply that the receiver sends back to the sender, step 611. The reply, in all three cases, informs the sender that the intended receiver has received the message and acted on it. Note that data actually moves from the server to the client in the reply to the get_bytes request 447, FIG. 4B, and from the client to the server in the put_bytes message, 463, FIG. 4C.

A situation in which a server must issue a revoke_bytes request, step 607 occurs when a get_bytes request arrives at a server from a client, step 606, that wishes to have write access to this range of bytes. The server must revoke all bytes within this range that have been previously sent to clients and not subsequently revoked. Each time that a client issues a get_bytes request, the server keeps a record of the get_bytes reply (FIG. 5) that the server has issued to that client. In this way, servers can keep track of all copies of the data belonging to a file that has been sent out to client nodes. When a get_bytes request arrives from a client that is requesting these bytes for writing, the server examines its records to ensure that no other clients currently have those same bytes checked out for either reading or writing. If other clients do have those bytes checked out, the server first revokes them by sending a revokes_bytes message to each of these clients having the bytes checked out. These clients send the bytes back to the server with the put_bytes message in the case where the bytes may have been modified, and the clients discard the bytes in the case where the bytes have not been modified. However, in all cases, after the bytes have been revoked, the clients do not have access to those bytes. After receiving the put_bytes reply, step 612, the client has been informed that the returned data has been received by the server, and the client replies to the revoke_bytes request, step 613.

When the server receives the revoke_bytes reply, step 614, (after receiving any put_bytes messages triggered by the revoke), the server is now free to respond to the get_bytes request for writing by sending the bytes to the requesting client in the get_bytes reply, giving that client permission to modify those bytes, steps 615, 616. In this way, data within a file is modified at only one place. If the data is being modified, no other clients have access to that range of data. This ensures that by the time the clients do gain access to the data again, the clients will view the data resulting from all subsequent write operations. This gives the effect of serialized access to the data.

The important rule is that for any byte within the file, only one machine can have that byte for writing, while any number of machines are allowed to have the byte checked out for reading. In the preferred embodiment, the bytes are not tracked on an individual basis. Instead, ranges of bytes are tracked that have been requested by clients. In the preferred embodiment, for any range of bytes only one client can have access to the range of bytes for write access.

The system and method of this invention controls how client machines can efficiently extend files and write into regions of the files previously unoccupied by data. It is desirable to minimize the number of messages sent back and forth between the clients and the servers. It is also desirable to minimize the possibility of a client over-committing disk space managed at the server.

Although most writing to files is done at the end where each new block is newly allocated and holds only zero bytes, in the most general case when a process writes or stores into a block of a remote file, the block must be obtained from the file's server before the write or store can be done. To mitigate the cost of the general mechanism, this invention optimizes an important special case: writing or storing into blocks not previously in the file. This reduces the cost of appending to existing files and creating new files.

If a client knows that a block in a file is a new block, one not yet in the file, it could create a block of zeros and use it without contacting the server. This would avoid the cost of a get_bytes request, but it would also create a block at a client without the allocation of a corresponding disk block at the file's server. To keep clients from overcommitting the server's resources and from interfering with each other by creating the same block in two places, servers maintain control over the allocation of new pages.

Servers manage the distributed allocation of new file blocks by sending nascent zeros in addition to real bytes to clients. When a server replies to a get_bytes request, it may optionally return an unrequested range of nascent zeros. Nascent zeros are new, logically zero bytes that are not yet contained in the file. The range of nascent zeros returned is usually larger than the range of requested bytes. The nascent zeros have never been stored or written to, and may be outside the current extent of the file. Like real bytes from the file, a range of nascent zeros is sent to a client that may write into them only if no other client has any data (real or nascent) that overlaps the range. Like real bytes, nascent zeros can be revoked by the server with a revoke_bytes message.

Client machines never explicitly request nascent zeros. Instead, clients receive nascent zeros unrequested from servers but only in reply to a get_bytes request. This means that servers are not obligated to return nascent zeros to clients; a simple server implementation will function correctly without ever giving out nascent zeros. However, such an implementation will not support clients as efficiently as an implementation that does use nascent zeros. When nascent zeros are distributed to client machines, they must be tracked like real bytes that have been given out. If a client requests a range of bytes that overlaps either real bytes or nascent zeros that have been given to a different client in a conflicting mode (i.e., read access versus write access), the server must revoke both the real bytes and the nascent zeros. Since the revoke_bytes request revokes both real bytes and nascent zeros in a specified range, servers need to send only one message to each client that holds the bytes or zeros. Servers can keep the accounting for the bytes and zeros that have been given out simply by revoking all bytes and nascent zeros for a file from each client that has any of the real bytes or nascent zeros of the file. A server that does this only needs to remember which clients have any bytes or zeros without regard for which bytes and nascent zeros have been given to which clients. More sophisticated servers can support higher concurrency among their clients by keeping information about the bytes and nascent zeros with finer granularity.

Figure 5:
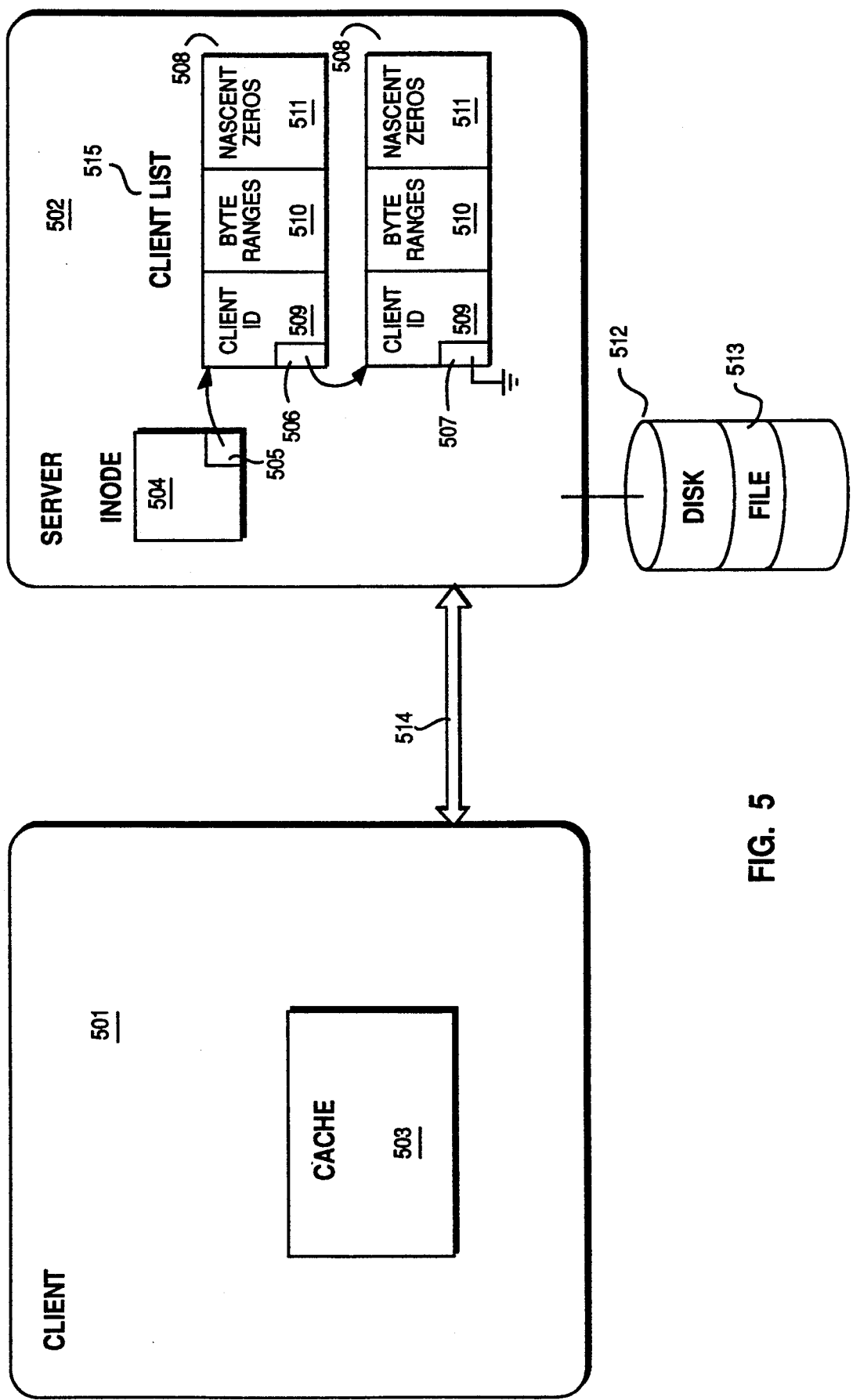
FIG. 5 shows a client data processing system and a server data processing system in the distributed data processing system of this invention.

Referring to FIG. 5, a get bytes request is sent by the client 501 to the server 502 over communications link 514 for a file 513 stored on disk 512 at the server in order to obtain bytes from the file for placement in the client's cache 503. The processing of the get_bytes request at the server examines the client list 515. The client list is located by examining the inode structure 504 for the file. Every file in use will have an inode structure. The inode structure for file being used by client machines will contain a link or pointer 505 to the beginning of the client list 515 for that file. This pointer points to the first client list entry 508 which in turn may contain a pointer 506 to subsequent entries on the client list. The last entry on the client list contains a null value for the pointer 507 indicating that there are no more entries on the client list. Each entry 508 has three components. The first component 509 identifies the remote client node. The second component 510 identifies all byte ranges that have been sent to the client and not yet revoked in addition to an indication for each of these byte ranges as to whether or not the client has been given permission to modify the range. Likewise, component 511 identifies all ranges of nascent zeros that have been given to the client. There will be one entry 508 on the client list for each remote client using the file.

Figure 7A:
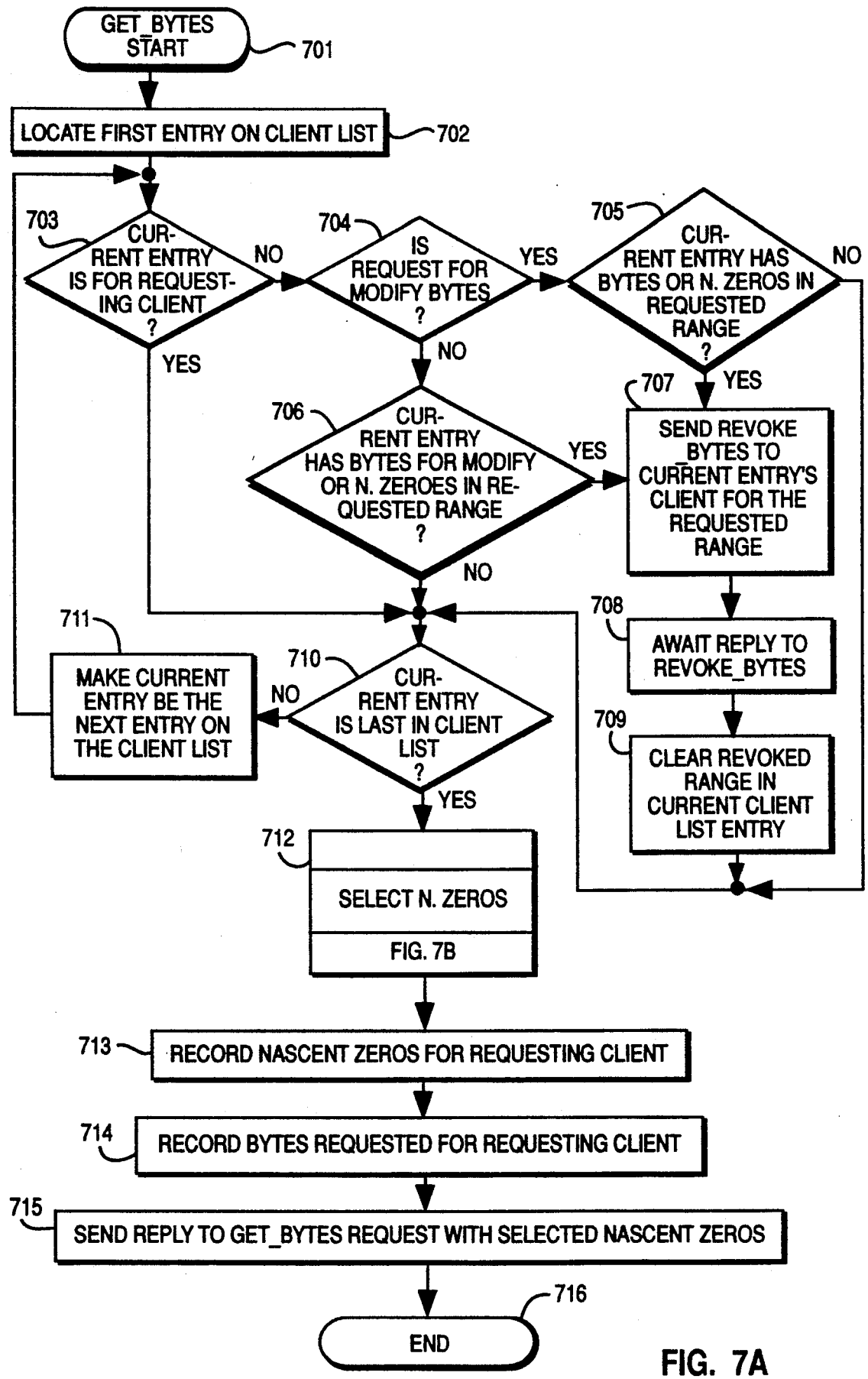
FIG. 7A is a flow diagram showing the operation of a get_bytes request at a server.

Referring to FIG. 7A, a get_bytes request processing at the server begins at step 701. In step 702, the client list is examined and the first entry on the client list is located. If the current client list entry is for the same client requesting bytes in the get_bytes request, then further processing for this entry in the client list is not necessary, and step 710 is executed next. Otherwise, the processing continues at step 704 where the nature of the current get_bytes request is examined. If the request is for bytes with permission to modify them, processing continues at step 705. Otherwise, processing continues at step 706 where the current client list entry is examined. If the client list entry indicates that the entry's client has received bytes with permission to modify or nascent zeros, within the range of the current get bytes request, processing continues at step 707. Otherwise, there is no further processing needed for this client list entry and processing continues at step 710. In step 705, the current client list entry is examined, if there are any bytes or nascent zeros that have been sent to the entry's client without having been revoked, that are within the range of requested bytes, processing continues with step 707. Otherwise, no further processing for this entry is needed, and processing continues with step 710. At step 707, which is arrived at in the case where bytes have to be revoked from the client indicated in the client list entry, a revoke_bytes message is sent to the client indicated in the current list entry for a range of bytes that correspond to a range of bytes being requested in the get_bytes request. Processing continues at step 708 where the reply for the revoke_bytes message is waited for. At step 709, the client list entry is updated to reflect the fact that the range of bytes have been revoked. Processing then continues with step 710. At step 710, the client list entry is examined to determine if it is the last entry in the client list. If not, then in step 711, the next entry in the client list becomes the current entry and processing continues at step 703. In step 710, if the current entry is the last entry in the client list, processing continues at step 712 where a range of nascent zeros is chosen to be returned with the reply to this get bytes request. Further details on the choice of nascent zeros to be returned is found in FIG. 7B. Processing continues in step 713 where the client list entry for the requesting client is updated to reflect the nascent zeros that will be sent to the client. In step 714, this entry is updated to reflect the range of bytes that is being returned in the get_bytes reply that is actually sent in step 715 finishing the processing of the get_bytes request at step 716.

The above description is described in the following programming design language code:

```
get_bytes( gb_client, gb_file, gb_range, gb_rw )
   -- request from gb_client
   -- for gb_range bytes
   -- in gb_file
   -- gb_rw = = true iff request is for modify
BEGIN
   FOR entry = first entry on client list for
gb_file
   TO last entry in client list
      IF entry's client is not gb_client
      THEN
         IF ( gb_rw = = true
            AND ( entry has a byte range that
               intersects gb_range
            OR
               entry has nascent zeros that
               intersect gb_range ))
         OR ( gb_rw = = false
            AND ( entry has a byte range for
               modify intersecting gb_range
            OR
               entry has nascent zeros that
               intesect gb_range ))
         THEN
            SEND revoke bytes to entry's
               client for gb_range;
            AWAIT revoke bytes reply;
            clear entry's byte range and
               nascent zeros for gb_range;
         ENDIF
      ENDIF
   ENDFOR
   -- all revoking done, now answer request
   CALL select_nascent_zero_range;
   record nascent zeros selected in
```

```
            client list entry for gb_client;
        record gb_range bytes with gb_rw in client
            list etry for gb_client;
        SEND reply to get_bytes request with selected
            nascent zeros;
    END
        Copyright IBM Corporation 1989
```

Figure 7B:
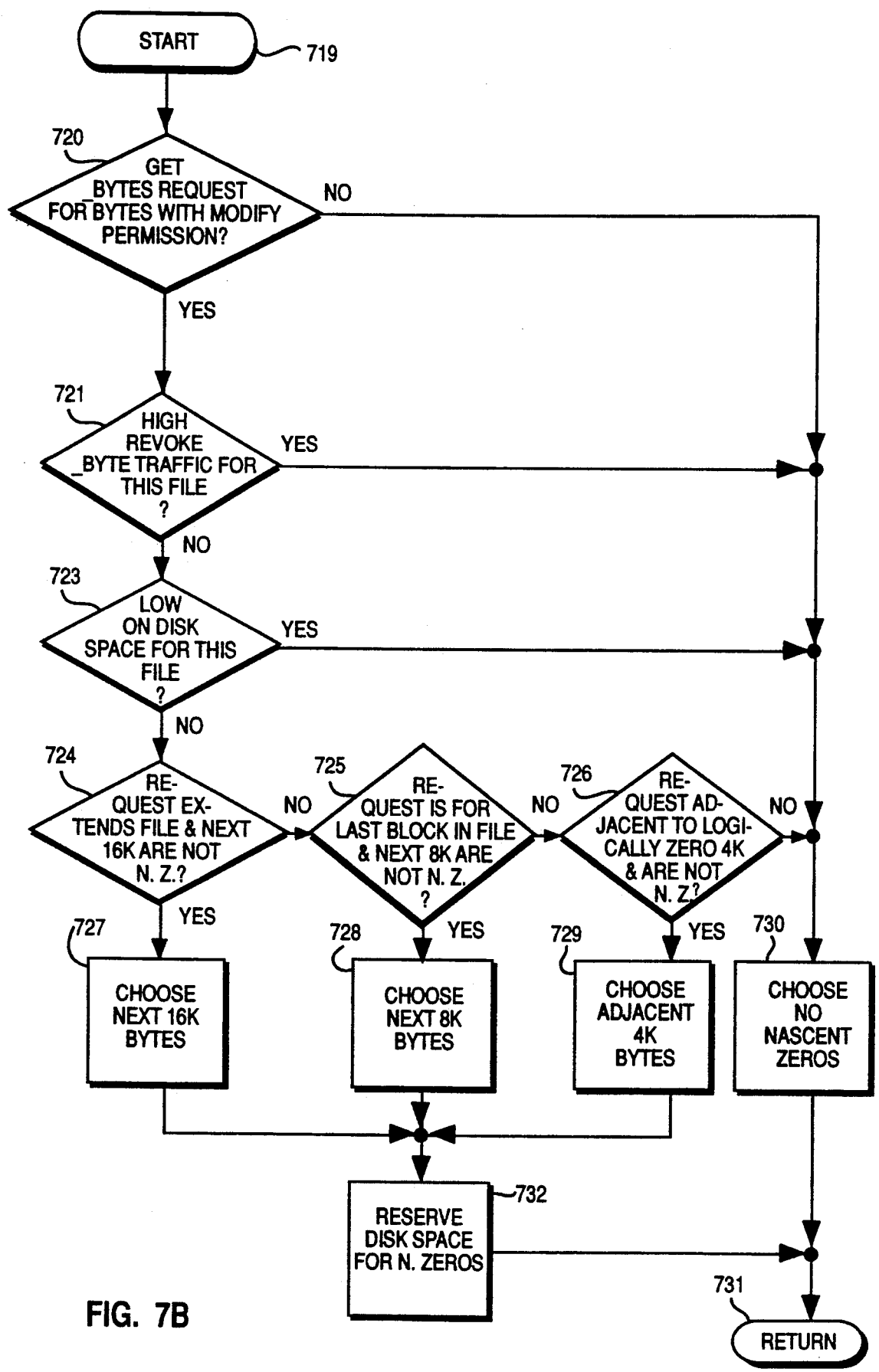
FIG. 7B is a flow diagram illustrating the selection of nascent zeros to be sent to a client in response to a request for access to bytes within a file.

With reference to FIG. 7B, the get_bytes request for which nascent zeros is being selected, is examined in step 720. If this get_bytes request is a request for bytes without permission to modify, i.e., for read only copy of the bytes, processing continues at step 730 where it is indicated that no nascent zeros are selected before returning in step 731. Otherwise, if the request is for permission to modify, in step 721, a determination is made as to whether there has been a high rate of revokes necessary for this file. If so, processing continues at step 730 where it is determined that no nascent zeros will be selected. Otherwise there has not been too high a rate of revokes, and processing continues at step 723 where the available space on the disk is examined. If disk space is too low, processing continues at step 730 where no nascent zeros are selected. Otherwise, the get_bytes request is examined in step 724. If it is determined that the get_bytes request extends the file, and the next 16K bytes have not already been allocated as nascent zeros, then the next 16K bytes are selected, step 727, as the nascent zeros to be returned in this get_bytes request. Disk space is then reserved for these nascent zeros in step 732, and processing returns in step 731. If it is determined in step 724 that this get_bytes request is not extending the file, then processing continues at step 725. In step 725, the get_bytes request is examined. If the bytes requested are the last block in the file, and the next 8K bytes have not already been allocated as nascent zeros, then the next 8K bytes are selected, step 728, and processing continues at step 732 where disk space is reserved. If in step 725, it is determined that the get_bytes request was not for the last block in the file, processing continues at step 726 where blocks adjacent to the requested bytes are examined. If 4K of logically zero bytes that have not been allocated as nascent zeros are found adjacent to the requested range of bytes, these bytes are selected in step 729, and disk space is reserved in step 732. Determining if logically zero bytes in the file are allocated as nascent zeros can be done by examining the client list entries.

The following programming design language code represents the above description:

```
select_nascent_zero_range ()
BEGIN
    IF gb_rw == false
       OR high revoke_byte traffic for gb_file
       OR low disk space available for gb_file
    THEN
        selected_range is empty;
        RETURN;
    ENDIF;
    IF gb_range is past end of file for gb_file
       AND 16K bytes past gb_range are logically zero
       AND 16K bytes past gb_range are not nascent zeros
           in any client list entry for gb_file
    THEN
        selected_range is 16K past gb_range;
    ELSE
        IF gb_range ends at end of file for gb_file
           AND 8K bytes past gb_range are logically
               zero
           AND 8K bytes past gb_range are not nascent
               zeros in any client list entry for
               gb_file
        THEN
            selected_range is 8K past gb_range;
        ELSE
            IF gb_range is adjacent to a 4K block
               that is logically zero and is not
               nascent zeros in any client list
               entry for gb_file
            THEN
                selected_range is the 4K block;
            ELSE
                selected_range is empty;
                RETURN;
            ENDIF
        ENDIF
    ENDIF
    reserve disk space for selected_range;
    RETURN
END
        Copyright IBM Corporation 1989
```

If a process on a client machine needs to access bytes in a file that have not been previously requested from the file's server, it may use any of the nascent zeros that it has received from the server for the file. Storing or writing into a nascent zero at a client turns it into a modified read byte, eventually returned to the server in a put_bytes message just as any modified byte is returned. The server can use revoke_bytes to force the client to send back all modified bytes, both originally real and originally nascent zero, in the requested range; unmodified real bytes and nascent zeros in the range are simply discarded by the client. The nascent zeros must be reacquired if they are to be used again.

Nascent zeros already have disk reservations at the server and may be safely added to the file by the client without informing the server. At the server, the disk reservation keeps clients from over committing the server's disk space. The reserved disk blocks become a part of the file only if the bytes are returned to the server. If the nascent zeros are not used by a client, they are not returned to the server and the disk reservations are eventually reclaimed.

Clients are not required to keep track of the nascent zeros that file servers send to them. A simple client implementation can ignore nascent zeros and still operate correctly. It will never use these zeros and, hence, never have to return them to the server. Such a client is forced to request each block of bytes before writing into it, even in the case of new blocks past the end of file, and will not append or write to new files as efficiently as clients that take advantage of nascent zeros.

When a client closes a file, the server is notified with the close message 410. Before sending the close message, the client is obligated to send to the server all modified data for the file. The client does this with the put_bytes message 460. Upon receiving the close request, the server can remove the client from the client list for the file, and recover any reserved disk space for nascent zeros that had been recorded for that client. Servers can recover the disk space reserved for nascent zeros in another way by revoking them with the revoke_bytes message. Servers may choose to do this when demands for disk space exceed the levels available after accounting for nascent zero reservations. Clients that have nascent zeros revoked will suffer the performance penalty of additional get_bytes messages when using bytes within the revoked range.

While the invention has been particularly shown and described with reference to a preferred embodiment, it will be understood by those skilled in the art that various changes in form and detail may be made without departing from the spirit and scope of the invention.

What is claimed is:

1. A method for access to a range of bytes in a file residing at a server data processing system from at least one client data processing system, wherein said server data processing system and said at least one client data processing system are connected through a means of communication; said method comprising:

returning, by said server, a description of a range of presently unused bytes in said server, as determined by said server, in a replay to a request from one of said at least one client data processing systems for an operation to be performed by said server; and granting, by said server, the client data processing system permission to use the described range of bytes.

2. A method of claim 1 further comprising reserving physical storage means for storing data at said server data processing system before granting the permission to use the described range.

3. A method of claim 2 further comprising determining, by the server data processing system whether said client data processing system has written to the described range of bytes when the client data processing system closes the file, the freeing up the reserved physical storage means if the client data processing system has not written to the described range of bytes.

4. A method of claim 1 wherein the request from one of said at least one client data processing systems is for the operation of obtaining write access to a requested range of bytes within the file.

5. A method of claim 4 wherein the granted use of the described range is for writing.

6. A method of claim 1 further comprising revoking, by the server data processing system, the permission to use the described range of bytes.

7. A method for access to a range of bytes in a file residing at said server data processing system from at least one client data processing system, wherein said server data processing system and said client data processing systems are connected through a means for communication; said method comprising:

replying, by said server, to a request from one of said at least one client data processing systems for write access to the range of bytes by returning an additional range of logically zero bytes, as determined by said server data processing system, with said requested range of bytes, thereby giving the client data processing system permission to write to a larger range of bytes than requested; and reserving physical storage space at said server data processing system for said additional range of bytes while the client data processing system has permission to write to the additional range of bytes.

8. A method for access to a range of bytes in a file residing at said server data processing system from at least one client data processing system, wherein said server data processing system and said client data processing system are connected through a means for communication; said method comprising:

replying, by said server, to a request from one of said client data processing system for write access to the range of bytes by returning an unrequested additional range of unwritten bytes, as determined by said server data processing system, with said requested range of bytes, thereby giving the client data processing system permission to write to a larger range of bytes than requested; and revoking permission to write to the range of bytes requested by the client data processing system and the additional unrequested range of bytes for controlling access, by the server data processing system, to the file from said client data processing systems.

9. A method for access to a range of bytes in a file residing at said server data processing system from at least one client data processing system, wherein said server data processing system and said client data processing systems are connected through a means for communication; said method comprising:

replying, by said server, to a request from one of said client data processing system for write access to the range of bytes representing a last block of said file by returning at least one unrequested additional block of unwritten bytes, as determined by said server data processing system, with said requested range of bytes, thereby giving the client data processing system permission to write to a larger range of bytes than requested; and receiving, by said server, a subsequent request to a next block of bytes of said file after said client data processing system has written to said requested last block of said file and said at least one unrequested additional block, thereby minimizing the number of times a new block of bytes is requested from said client data processing system.

10. A method, in a distributed data processing system having a plurality of data processing systems connected through a means for communication, for access to a range of bytes in a file residing at a first one of said data processing systems requested by at least one second data processing systems; said method comprising:

returning, from the first data processing system, the range of bytes requested from the second data processing system;

optionally returning, from a determination at said first data processing system whether an additional unwritten range of bytes is returned with said returned requested range of bytes; and writing to said returned additional unwritten range of bytes by said second data processing system if said second data processing system recognizes said additional unwritten range of bytes and if said second data processing system elects to write to said additional unwritten range of bytes.

11. A system having means for accessing a range of bytes in a file residing at a first data processing system from a second data processing system, wherein said first data processing system and said second data processing system are connected by a means of communication, said system comprising:

means for returning, by said server, a description of a range of presently unused bytes, as determined by said first data processing system, in a reply to a request from said second one of said data processing system for an operation to be performed by the first data processing system on said file; and means for granting, by said server data processing system, the second data processing system permission to use the described range of said bytes.

12. A method for access to a range of bytes in a file residing at a server data processing system from at least one client data processing system, wherein said server data processing system and said at least one client data processing system are connected through a means of communication; said method comprising:

returning, by said server, a description of a range of presently unused bytes in said file, as determined by said server, in a reply to a request from one of said at least one client data processing systems for an operation to be performed by said server; and granting, by said server, the client data processing system permission to use the described range of bytes.

* * * * *